United States Patent
Yu

(10) Patent No.: US 10,944,319 B2
(45) Date of Patent: Mar. 9, 2021

(54) FLYING BATTERY WITH AC SWITCH PFC FRONT END FOR UPS

(71) Applicant: SCHNEIDER ELECTRIC IT CORPORATION, West Kingston, RI (US)

(72) Inventor: Qinghong Yu, Carlisle, MA (US)

(73) Assignee: SCHNEIDER ELECTRIC IT CORPORATION, Foxboro, MA (US)

( * ) Notice: Subject to any disclaimer, the term of this patent is extended or adjusted under 35 U.S.C. 154(b) by 122 days.

(21) Appl. No.: 16/206,027

(22) Filed: Nov. 30, 2018

(65) Prior Publication Data

US 2020/0177074 A1 Jun. 4, 2020

(51) Int. Cl.
*H02M 1/42* (2007.01)
*H02J 9/06* (2006.01)
*H02M 7/217* (2006.01)

(52) U.S. Cl.
CPC ........... *H02M 1/4266* (2013.01); *H02J 9/062* (2013.01); *H02M 7/217* (2013.01); *H02J 2207/20* (2020.01)

(58) Field of Classification Search
None
See application file for complete search history.

(56) References Cited

U.S. PATENT DOCUMENTS

| | | | |
|---|---|---|---|
| 6,181,029 B1* | 1/2001 | Berglund | ................ H02J 9/062 307/66 |
| 6,266,260 B1 | 7/2001 | Zahrte, Sr. et al. | |
| 8,884,464 B2 | 11/2014 | Jayaraman et al. | |
| 2009/0160254 A1* | 6/2009 | Wu | ..................... H02M 1/4208 307/66 |
| 2013/0027126 A1 | 1/2013 | Jayaraman et al. | |
| 2013/0049699 A1* | 2/2013 | Jayaraman | ............ H02M 5/458 320/137 |

(Continued)

FOREIGN PATENT DOCUMENTS

EP 0660498 A2 6/1995

OTHER PUBLICATIONS

Hang, Lijun et al., "A High Power Density Three-Phase PFC Converter Based on Vienna Topology," 2012 IEEE 7th International Power Electronics and Motion Control Conference—ECCE Asia, Jun. 2-5, 2012, Harbin, China, pp. 1034-1037.

(Continued)

*Primary Examiner* — Jared Fureman
*Assistant Examiner* — Joel Barnett
(74) *Attorney, Agent, or Firm* — Lando & Anastasi, LLP

(57) ABSTRACT

A UPS comprising an input, an output, a battery circuit, a PFC stage, a switch configured to selectively couple an interface of the PFC stage to the input in an online mode and to the battery circuit in a backup mode, a positive DC bus, a negative DC bus, and a controller configured to operate, in the online mode, the PFC stage to provide DC power, derived from the input AC power, to the DC busses, to operate, in the backup mode, the PFC stage to provide DC power, derived from the backup DC power, to the DC busses, to operate, in a first stage of the backup mode, the battery circuit to couple a positive terminal of a DC source to the interface, and to operate, in a second stage of the backup mode, the battery circuit to couple a negative terminal of the DC source to the interface.

20 Claims, 5 Drawing Sheets

(56) References Cited

U.S. PATENT DOCUMENTS

2014/0354056 A1* 12/2014 Chen ................ H02J 9/062
                                                  307/52
2019/0199126 A1*  6/2019 Cheng ............... H02J 9/062

OTHER PUBLICATIONS

Kolar, Johann W. et al., "A Novel Three-Phase Utility Interface Minimizing Line Current Harmonics of High-Power Telecommunications Rectifier Modules," 1994, IEEE, pp. 367-374.

Kolar, Johann W. et al., "Design and Experimental Investigation of a Three-Phase High Power Density High Efficiency Unity Power Factor PWM (VIENNA) Rectifier Employing a Novel Integrated Power Semiconductor Module," 1996, IEEE, pp. 514-523.

TI Designs: TIDM-1000, Vienna Rectifer-Based, Three-Phase Power Factor Correction (PFC) Reference Design Using C2000™ MCU, TIDUCJOC—Nov. 2016—Revised Jul. 2017, Texas Instruments Incorporated, pp. 55.

Extended European Search Report from corresponding European Application No. 19209278.1 dated Feb. 10, 2020.

\* cited by examiner

FLYING BATTERY WITH AC SWITCH PFC FRONT END FOR UPS

BACKGROUND

1. Field of Invention

The present invention relates generally to uninterruptible power supplies (UPS).

2. Discussion of Related Art

The use of power devices, such as uninterruptible power supplies (UPS), to provide regulated, uninterrupted power for sensitive and/or critical loads, such as computer systems and other data processing systems, is known. Known uninterruptible power supplies include on-line UPS's, off-line UPS's, line interactive UPS's as well as others. On-line UPS's provide conditioned AC power as well as back-up AC power upon interruption of a primary source of AC power. Off-line UPS's typically do not provide conditioning of input AC power, but do provide back-up AC power upon interruption of the primary AC power source. Line interactive UPS's are similar to off-line UPS's in that they switch to battery power when a blackout occurs but also typically include a multi-tap transformer for regulating the output voltage provided by the UPS.

SUMMARY

At least one aspect of the invention is directed to an Uninterruptible Power Supply (UPS) comprising an input configured to be coupled to an AC power source and to receive input AC power, an output configured to provide output power to a load, a battery circuit configured to be coupled to a DC source and to receive backup DC power, a Power Factor Correction (PFC) stage including an interface, an input switch configured to selectively coupled the interface of the PFC stage to the input in an online mode of operation and to the battery circuit in a backup mode of operation, a positive DC bus coupled to the PFC stage, a negative DC bus coupled to the PFC stage, and a controller coupled to the battery circuit and the PFC stage, the controller configured to operate, in the online mode of operation, the PFC stage to provide DC power, derived from the input AC power, to the positive DC bus and the negative DC bus, to operate, in the backup mode of operation, the PFC stage to provide DC power, derived from the backup DC power, to the positive DC bus and the negative DC bus, to operate, in a first stage of the backup mode of operation, the battery circuit to couple a positive terminal of the DC source to the interface of the PFC stage, and to operate, in a second stage of the backup mode of operation, the battery circuit to couple a negative terminal of the DC source to the interface of the PFC stage.

According to one embodiment, the UPS further comprises a neutral line, and the battery circuit comprises a first switch configured to be coupled between the input switch and the negative terminal of the DC source, a second switch configured to be coupled between the negative terminal of the DC source and the neutral line, a third switch configured to be coupled between the input switch and the positive terminal of the DC source, and a fourth switch configured to be coupled between the positive terminal of the DC source and the neutral line. In one embodiment, in operating the battery circuit to couple the positive terminal of the DC source to the interface of the PFC stage, the controller is further configured to operate the third switch to couple the positive terminal to the interface of the PFC stage via the input switch and to operate the second switch to couple the negative terminal to the neutral line.

According to another embodiment, in operating the battery circuit to couple the negative terminal of the DC source to the interface of the PFC stage, the controller is further configured to operate the first switch to couple the negative terminal to the interface of the PFC stage via the input switch and to operate the fourth switch to couple the positive terminal to the neutral line. In one embodiment, the PFC stage comprises an inductor coupled to the interface, a plurality of switches coupled to the inductor, a first bus capacitor coupled to the positive DC bus, and a second bus capacitor coupled to the negative DC bus. In another embodiment, in operating the PFC stage to provide DC power, derived from the backup DC power, to the positive DC bus and the negative DC bus, the controller is further configured to operate the plurality of switches, in the first stage of the backup mode of operation, to generate a positive DC voltage on the positive DC bus.

According to one embodiment, in operating the PFC stage to provide DC power, derived from the backup DC power, to the positive DC bus and the negative DC bus, the controller is further configured to operate the plurality of switches, in the second stage of the backup mode of operation, to generate a negative DC voltage on the negative DC bus. In one embodiment, the plurality of switches includes a fifth switch coupled to the inductor, a sixth switch coupled between the fifth switch and the neutral line, a seventh switch coupled between the inductor and the positive DC bus, and an eighth switch coupled between the inductor and the negative DC bus. In another embodiment, in operating the plurality of switches, in the first stage of the backup mode of operation, to generate the positive DC voltage on the positive DC bus, the controller is further configured to operate the fifth switch, the sixth switch, and the seventh switch as a boost converter to generate the positive DC voltage.

According to another embodiment, in operating the plurality of switches, in the second stage of the backup mode of operation, to generate the negative DC voltage on the negative DC bus, the controller is further configured to operate the fifth switch, the sixth switch, and the eighth switch as a boost converter to generate the negative DC voltage. In one embodiment, the UPS further comprises an inverter coupled between the DC busses and the output and configured to provide an output AC voltage waveform derived from at least one of the input AC power and the backup DC power, wherein the controller is further configured to synchronize generating the positive DC voltage on the positive DC bus with a positive half cycle of the output AC voltage waveform, and wherein the controller is further configured to synchronize generating the negative DC voltage on the negative DC bus with a negative half cycle of the output AC voltage waveform. In one embodiment, the PFC stage comprises a Vienna rectifier.

Another aspect of the invention is directed to a method for operating a UPS comprising an input configured to be coupled to an AC power source, an output configured to provide output power to a load, a battery circuit, a PFC stage, a positive DC bus, and a negative DC bus, wherein the method comprises receiving input AC power at the input from the AC power source, receiving backup DC power at the battery circuit from the DC power source, operating the UPS in an online mode of operation in response to a determination that the input AC power is greater than an input power threshold, operating the UPS in a backup mode of operation in response to a determination that the input AC power is less than the input power threshold, selectively coupling the input to an interface of the PFC stage in the online mode of operation, selectively coupling the battery circuit to the interface of the PFC stage in the backup mode of operation, converting, in the online mode of operation with the PFC stage, the input AC power into DC power provided to the positive and negative DC busses, converting, in the backup mode of operation with the PFC stage, the backup DC power into the DC power provided to the positive and negative DC busses, coupling, with the battery circuit in a first stage of the backup mode of operation, a positive terminal of the DC power source to the interface of the PFC stage, and coupling, with the battery circuit in a second stage of the backup mode of operation, a negative terminal of the DC power source to the interface of the PFC stage.

According to one embodiment, coupling the positive terminal of the DC power source to the interface of the PFC stage in the first stage includes operating a first switch to couple the positive terminal to the interface of the PFC stage, and operating a second switch to couple the negative terminal to a neutral line. In one embodiment, coupling the positive terminal of the DC power source to the interface of the PFC stage in the second stage includes operating a third switch to couple the negative terminal to the interface of the PFC stage, and operating a fourth switch to couple the positive terminal to a neutral line. In another embodiment, converting, in the backup mode of operation with the PFC stage, the backup DC power into the DC power provided to the positive and negative DC busses includes generating, during the first stage of the backup mode of operation, a positive DC voltage on the positive DC bus, and generating, during the second stage of the backup mode of operation, a negative DC voltage on the negative DC bus.

According to another embodiment, generating the positive DC voltage on the positive DC bus includes operating a plurality of switches in the PFC stage as a boost converter to generate the positive DC voltage. In one embodiment, generating the negative DC voltage on the negative DC bus includes operating the plurality of switches in the PFC stage as a boost converter to generate the negative DC voltage. In another embodiment, the UPS further comprises an inverter configured to provide an output AC voltage waveform derived from at least one of the input AC power and the backup DC power, and the method further comprises synchronizing generating the positive DC voltage on the positive DC bus with a positive half cycle of the output AC voltage waveform, and synchronizing generating the negative DC voltage on the negative DC bus with a negative half cycle of the output AC voltage waveform.

At least one aspect of the invention is directed to an Uninterruptible Power Supply (UPS) comprising an input configured to be coupled to an AC power source and to receive input AC power, an output configured to provide output power to a load, a positive DC bus, a negative DC bus, a PFC stage coupled to the positive DC bus and the negative DC bus and configured to convert the input AC power into regulated DC power provided to the positive DC bus and the negative DC bus, and means for selectively coupling the PFC stage to one of the input and a DC source and for operating the PFC stage to convert backup DC power from the battery into the regulated DC power provided to the positive DC bus and the negative DC bus.

BRIEF DESCRIPTION OF THE DRAWINGS

Various aspects of at least one embodiment are discussed below with reference to the accompanying figures, which are not intended to be drawn to scale. The figures are included to provide illustration and a further understanding of the various aspects and embodiments, and are incorporated in and constitute a part of this specification, but are not intended as a definition of the limits of the invention. In the figures, each identical or nearly identical component that is illustrated in various figures is represented by a like numeral. For purposes of clarity, not every component may be labeled in every figure. In the figures.

DETAILED DESCRIPTION

Figure 1:
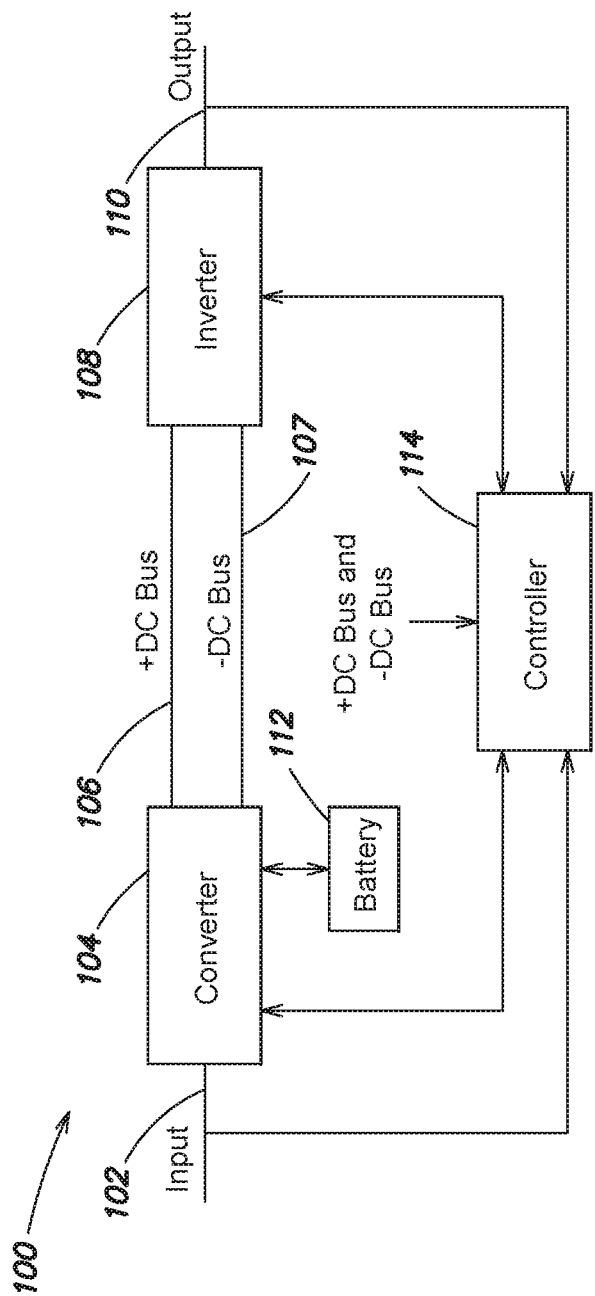
FIG. 1 is a schematic diagram of a UPS according to aspects described herein.

Examples of the methods and systems discussed herein are not limited in application to the details of construction and the arrangement of components set forth in the following description or illustrated in the accompanying drawings. The methods and systems are capable of implementation in other embodiments and of being practiced or of being carried out in various ways. Examples of specific implementations are provided herein for illustrative purposes only and are not intended to be limiting. In particular, acts, components, elements and features discussed in connection with any one or more examples are not intended to be excluded from a similar role in any other examples.

Also, the phraseology and terminology used herein is for the purpose of description and should not be regarded as limiting. Any references to examples, embodiments, components, elements or acts of the systems and methods herein referred to in the singular may also embrace embodiments including a plurality, and any references in plural to any embodiment, component, element or act herein may also embrace embodiments including only a singularity. References in the singular or plural form are not intended to limit the presently disclosed systems or methods, their components, acts, or elements. The use herein of "including," "comprising," "having," "containing," "involving," and variations thereof is meant to encompass the items listed thereafter and equivalents thereof as well as additional items. References to "or" may be construed as inclusive so that any terms described using "or" may indicate any of a single, more than one, and all of the described terms. In addition, in the event of inconsistent usages of terms between this document and documents incorporated herein by reference, the term usage in the incorporated references is supplementary to that of this document; for irreconcilable inconsistencies, the term usage in this document controls.

As discussed above, power devices, such as uninterruptible power supplies (UPS), are oftentimes used to provide regulated, uninterrupted power to sensitive and/or critical loads. A conventional online UPS rectifies input AC power provided by an electric utility using a Power Factor Correction circuit (PFC) to provide DC power to at least one DC bus. The rectified DC power on the DC buses is typically used to charge a battery while mains power is available. In the absence of mains power, the battery discharges and provides DC power to the DC buses. From the DC power on the DC buses, an inverter generates an AC output voltage that is provided to a load. Since the DC bus is powered either by mains or the battery, the output power of the UPS is uninterrupted if the mains fails and the battery is sufficiently charged. Typical online UPS's may also operate in a bypass mode where unconditioned power with basic protection is provided directly from an AC power source to a load via a bypass line.

A UPS with a relatively high power rating typically includes a battery with a relatively high voltage level. The relatively high voltage level of the battery in a high-power UPS may make it practical to use a non-isolated boost converter to convert the battery voltage to a level appropriate to power the inverter stage. This is because a boost converter generally has a high efficiency when the input voltage of the boost converter is close to (e.g., only slightly lower then) the target regulated output voltage. For example, in some conventional high-power UPS systems, the front-end PFC stage of the UPS is reused as a boost converter to convert DC power from the battery to regulated DC power provided to the inverter during on-battery mode.

In at least one embodiment, a more efficient PFC converter front-end circuit is described herein that can be reused as a boost converter during on-battery mode (i.e., backup mode) to convert DC power from a battery to regulated DC power provided to an inverter of a UPS.

FIG. 1 is a block diagram of an online UPS 100 according to one aspect of the present invention. The UPS 100 includes an input 102, a converter 104, a positive DC bus 106, a negative DC bus 107, an inverter 108, an output 110, and a controller 114. The input 102 is coupled to the converter 104. The positive DC bus 106 and the negative DC bus 107 are coupled between the converter 104 and the inverter 108. The output 110 is coupled to the inverter 108. The controller 114 is coupled to the input 102, the output 110, the converter 104, the positive DC bus 106, the negative DC bus 107, and the inverter 108. The converter 104 is also configured to be coupled to a battery 112.

The input 102 is configured to be coupled to an AC mains power source and to receive input AC power having an input voltage level. The controller 114 monitors the input AC power received by the input 102 and is configured to operate the UPS 100 in different modes of operation based on the status of the input AC power received by the input 102. When AC power provided to the input 102 is acceptable (i.e., above an input power threshold), the controller 114 operates the UPS 100 in an online mode of operation. In the online mode of operation, AC power from the input 102 is provided to the converter 104. According to one embodiment, the converter 104 is a Power Factor Correction converter 104; however, in other embodiments, other types of converters may be utilized.

The controller 114 operates the converter 104 to convert the AC power into DC power and provide the DC power to the positive DC bus 106 and the negative DC bus 107. In one embodiment, DC power is also provided from the converter 104 to the battery 112 to charge the battery 112. In another embodiment, DC power from the positive DC bus 106 and the negative DC bus 107 is provided to the battery 112 via a DC/DC converter to charge the battery 112. In the online mode of operation, the inverter 108 receives DC power from the positive DC bus 106 and the negative DC bus 107, and the controller 114 operates the inverter 108 to convert the DC power into regulated AC power and provide regulated AC power to a load coupled to the output 110.

When AC power provided to the input 102 is not acceptable (i.e., below an input power threshold), the controller 114 operates the UPS 100 in a backup mode of operation. In the backup mode of operation, DC power from the battery 112 is regulated (e.g., by the converter 104) and provided to the positive DC bus 106 and the negative DC bus 107. The inverter 108 receives the DC power from the positive DC bus 106 and the negative DC bus 107, and the controller 114 operates the inverter 108 to convert the DC power into regulated AC power and provide the regulated AC power to the output 110.

Figure 2:
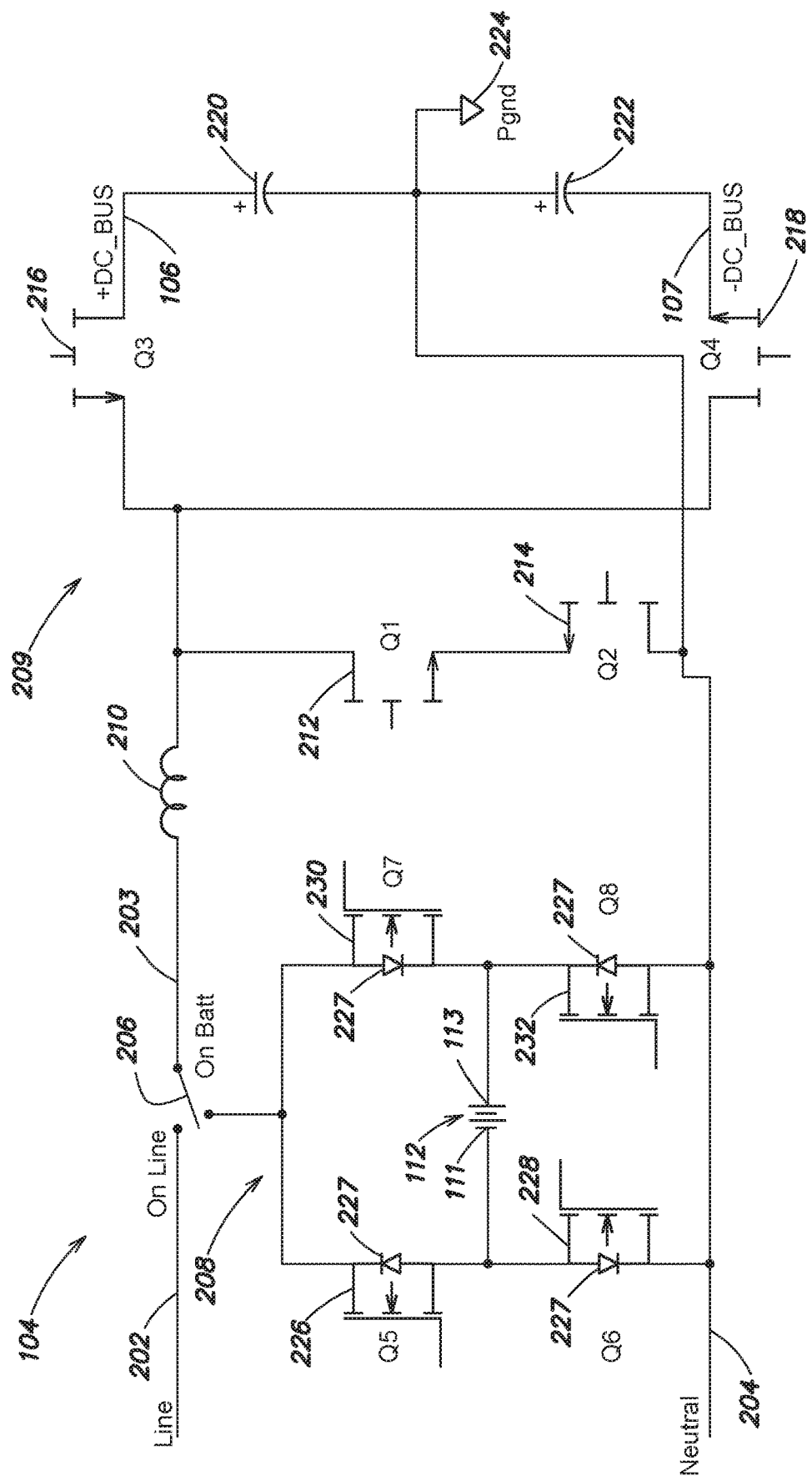
FIG. 2 is a schematic diagram of one embodiment of a converter according to aspects described herein.

FIG. 2 is a schematic diagram illustrating one embodiment of the converter 104. The converter 104 includes an input line 202, a neutral line 204, an input switch 206, a battery circuit 208, and a PFC stage 209. The PFC stage 209 includes an interface 203, an inductor 210, a first switch (Q1) 212, a second switch (Q2) 214, a third switch (Q3) 216, a fourth switch (Q4) 218, a first bus capacitor 220, and a second bus capacitor 222. The battery circuit 208 includes a fifth switch (Q5) 226, a sixth switch (Q6) 228, a seventh switch (Q7) 230, and an eight switch (Q8) 232. In one embodiment, the switches (Q1-Q8) 212-232 are Gallium Nitride (GaN) Field-Effect Transistors; however, in other embodiments, different types of switches or transistors can be utilized. For example, in one embodiment, the switches (Q1-Q8) 212-232 are Metal-Oxide-Semiconductor Field-Effect Transistors (MOSFET). In another embodiment, for switches Q5-Q8 226-232, thyristors can be used. In at least one embodiment where the switches (Q1-Q8) 212-232 are GaN FETs and/or MOSFETs, each switch (Q1-Q8) 212-232 includes a built-in body diode coupled between the drain and the source. The body diodes 227 of switches Q5-Q8 226-232 are shown in FIG. 2, while the body diodes of switches Q1-Q4 212-218 are not shown for illustrative purposes.

The input line 202 and the neutral line 204 are configured to be coupled to an input power source (e.g., mains) via the input 102. The neutral line 204 is coupled to ground 224. The input switch 206 is configurable to selectively couple either the input line 202 or the battery circuit 208 to the interface 203. The interface 203 is coupled to a first end of the inductor 210. The second end of the inductor 210 is coupled to the drain of the first switch (Q1) 212. The source of the first switch (Q1) 212 is coupled to the source of the second switch (Q2) 214. The drain of the second switch (Q2) 214 is coupled to the neutral line 204. The second end of the inductor 210 is also coupled to the source of the third switch (Q3) 216 and the drain of the fourth switch (Q4) 218. The drain of the third switch (Q3) 216 is coupled to the positive DC bus 106. The source of the fourth switch (Q4) 218 is coupled to the negative DC bus 107. The first bus capacitor 220 is coupled between the positive DC bus 106 and the neutral line 204. The second bus capacitor 222 is coupled between the negative DC bus 107 and the neutral line 204.

The drain of the fifth switch (Q5) 226 and the source of the seventh switch (Q7) 230 are coupled to the input switch 206. The source of the fifth switch (Q5) 226 is configured to be coupled to a negative terminal 111 of the battery 112. The drain of the seventh switch (Q7) 230 is configured to be coupled to a positive terminal 113 of the battery 112. The source of the sixth switch (Q6) 228 is configured to be coupled to the negative terminal 111 of the battery 112. The drain of the eight switch (Q8) 232 is configured to be coupled to the positive terminal 113 of the battery 112. The drain of the sixth switch (Q6) 228 and the source of the eighth switch (Q8) are coupled to the neutral line 204. The controller 114 is coupled to the gate of each switch (Q1-Q8) 212-232 and the input switch 206 and is configured to transmit control signals to (i.e., control operation of) each switch (Q1-Q8) 212-232 and the input switch 206).

As described above, the controller 114 monitors the input AC power received by the input 102 and is configured to operate the UPS 100 in different modes of operation based on the status of the input AC power received by the input 102. When input AC power provided to the input 102 is acceptable (i.e., above an input power threshold), the controller 114 operates the UPS 100 in the online mode of operation. In the online mode of operation, the controller 114 operates the input switch 206 to couple the input line 202 to the inductor 210 via the interface 203. When the input line 202 is coupled to the inductor 210, the controller 114 operates the first switch (Q1) 212, second switch (Q2) 214, third switch (Q3) 216, and fourth switch (Q4) 218, in conjunction with the inductor 210 and the bus capacitors 220, 222, to generate a positive output DC voltage on the positive DC bus 106 and a negative output DC voltage on the negative DC bus 107. In at least one embodiment, the controller 114 also operates the first switch (Q1) 212, second switch (Q2) 214, third switch (Q3) 216, and fourth switch (Q4) 218 to provide Power Factor Correction (PFC).

When AC power provided to the input 102 is not acceptable (i.e., below an input power threshold), the controller 114 operates the UPS 100 in a backup mode of operation. In the backup mode of operation, the converter 104 is operated in multiple stages. For example, FIG. 3 is a schematic diagram of a first stage of the backup mode of operation where a positive DC voltage is generated on the positive DC bus 106, and FIG. 4 is a schematic diagram of a second stage of the backup mode of operation where a negative DC voltage is generated on the negative DC bus 107.

Figure 3:
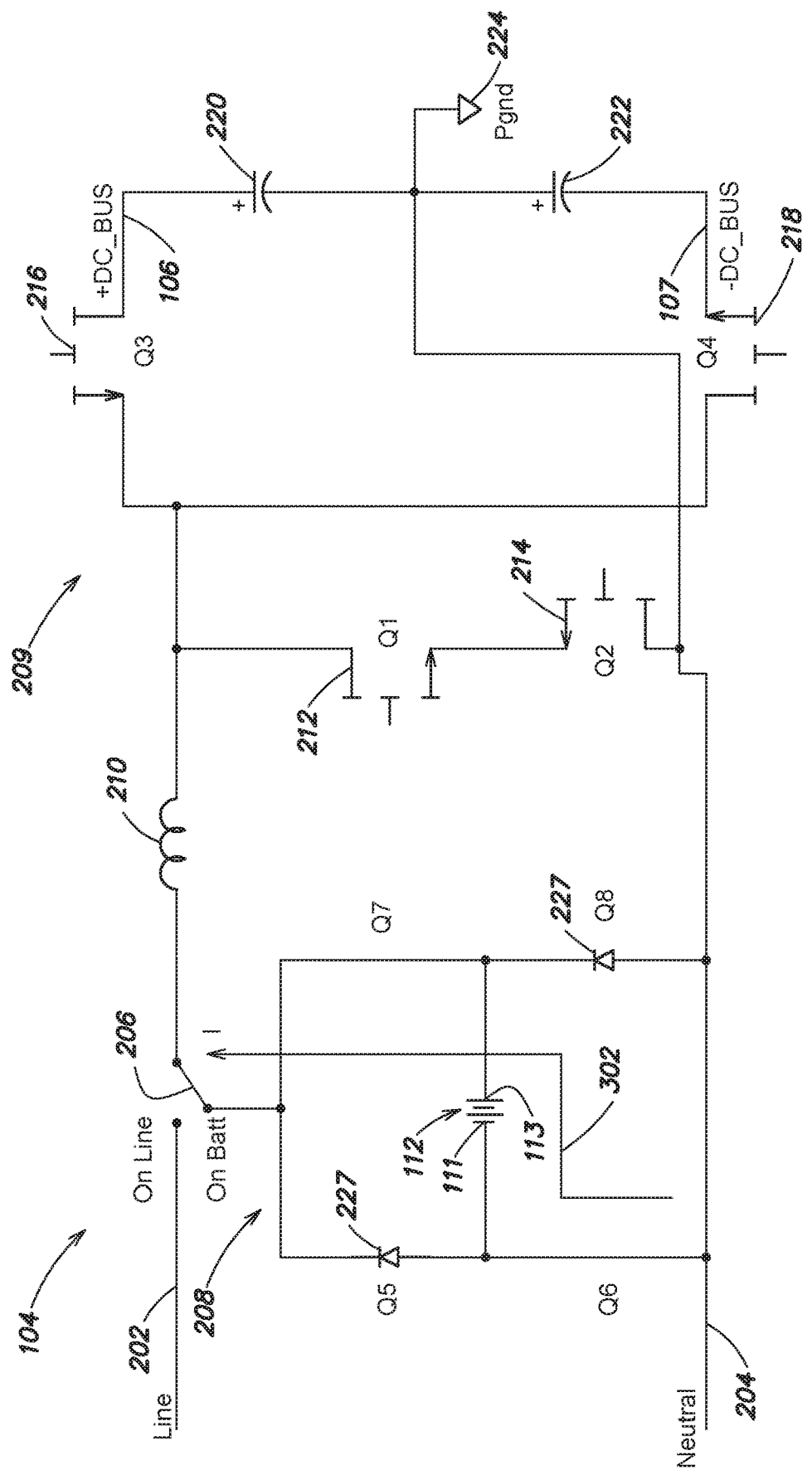
FIG. 3 is a schematic diagram of one embodiment of a converter operating in a positive stage of a backup mode of operation according to aspects described herein.
Figure 4:
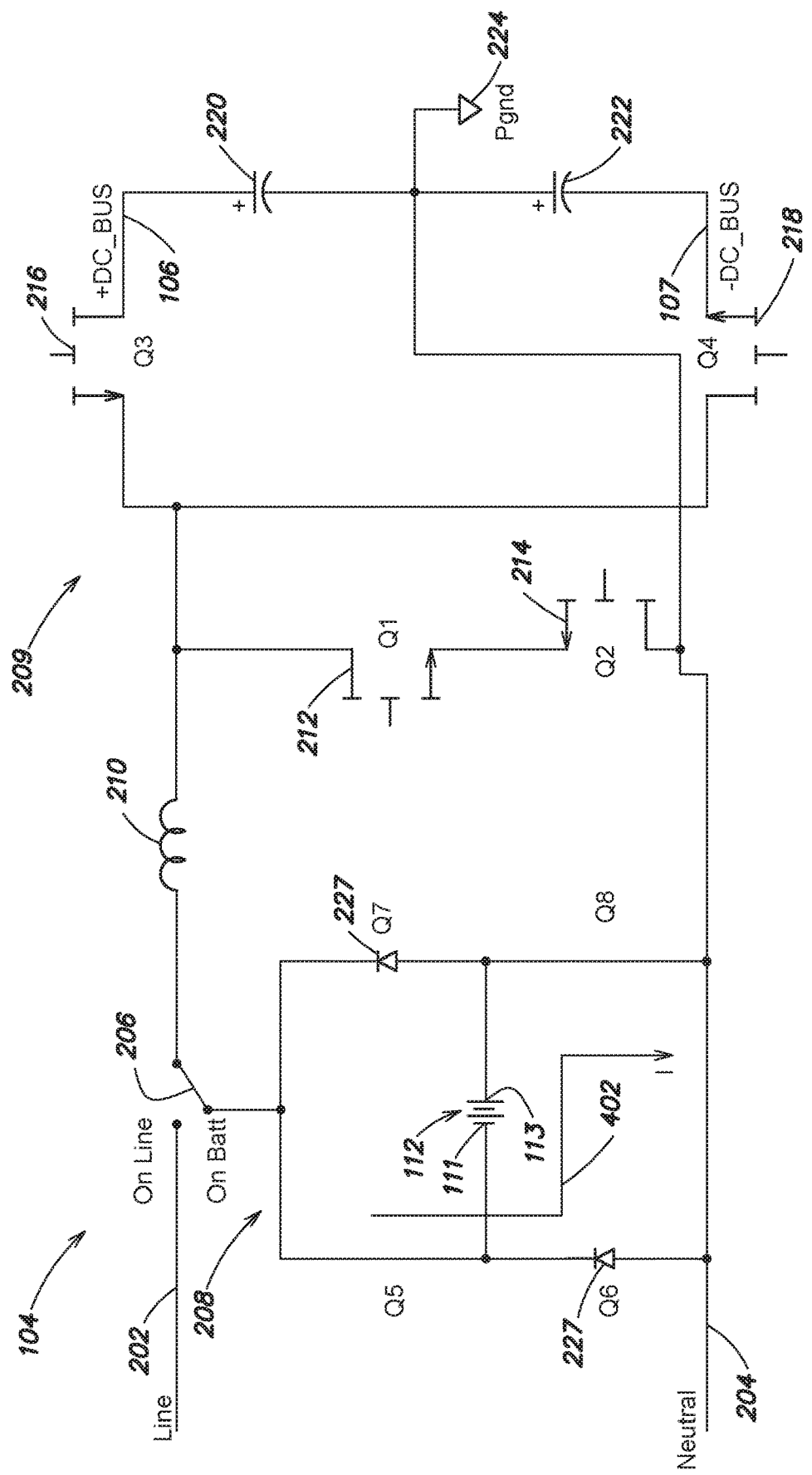
FIG. 4 is a schematic diagram of one embodiment of a converter operating in a negative stage of a backup mode of operation according to aspects described herein.

During the first stage of the backup mode of operation, for example shown in FIG. 3, the controller 114 operates the input switch 206 to couple the battery circuit 208 to the inductor 210 via the interface 203. Also during the first stage of the backup mode of operation, the controller 114 operates the converter 104 to couple the positive terminal 113 of the battery 112 to the inductor 210 and the negative terminal 111 of the battery 112 to the neutral line 204. For example, in at least one embodiment, the controller 114 operates the sixth switch (Q6) 228 to close, coupling the positive terminal 113 to the inductor 210 (via the input switch 206 and the interface 203), and the seventh switch (Q7) 230 to close, coupling the negative terminal 111 to the neutral line 204. Closed switches Q6 228 and Q7 230 are shown in FIG. 3 as resulting direct connections.

In the first stage of the backup mode of operation when the sixth switch (Q6) 228 and the seventh switch (Q7) 230 are closed, the body diodes 227 of the fifth switch (Q5) 226 and the eighth switch (Q8) 232 are reverse biased and a current path 302, shown in FIG. 3, is generated. The controller 114 operates the first switch (Q1) 212, the second switch (Q2) 214, and the third switch (Q3) 216 as a boost converter to charge the bus capacitor 220 coupled to the positive DC bus 106 (i.e., generate a positive DC voltage on the positive DC bus 106). More specifically, the controller 114 alternates switching of the first switch (Q1) 212, the second switch (Q2) 214, and the third switch (Q3) 216 to generate the desired positive voltage level on the positive DC bus 106. For example, when the first switch (Q1) 212 and the second switch (Q2) 214 are closed, the current path 302 passes from the inductor 210 to the neutral line 204, via the first switch (Q1) 212, and the second switch (Q2) 214, energy is stored in the inductor 210, and the current through the inductor 210 increases.

When the first switch (Q1) 212 and the second switch 214 are subsequently opened, a resulting current path from the inductor 210 to the positive DC bus 106, via the body diode of the third switch (Q3), 216 is generated. The third switch (Q3) 216 can subsequently be operated to close by the controller 114. By operating the switches as described above, the desired positive DC voltage level can be generated on the positive DC bus 106.

During the second stage of the backup mode of operation, for example shown in FIG. 4, the controller 114 operates the input switch 206 to couple the battery circuit 208 to the inductor 210 via the interface 203. Also during the second stage of the backup mode of operation, the controller 114 operates the converter 104 to couple the negative terminal 111 of the battery 112 to the inductor 210 and the positive terminal 113 of the battery 112 to the neutral line 204. For example, in at least one embodiment, the controller 114 operates the fifth switch (Q5) 226 to close, coupling the negative terminal 111 to the inductor 210 (via the input switch 206 and the interface 203), and the eighth switch (Q8) 233 to close, coupling the positive terminal 113 to the neutral line 204. Closed switches Q5 226 and Q8 232 are shown in FIG. 4 as resulting direct connections.

In the second stage of the backup mode of operation when the fifth switch (Q5) 226 and the eighth switch (Q8) 232 are closed, the body diodes 227 of the sixth switch (Q6) 228 and the seventh switch (Q7) 230 are reverse biased and a current path 402, shown in FIG. 4, is generated. The controller 114 operates the first switch (Q1) 212, the second switch (Q2) 214, and the fourth switch (Q4) 218 as a boost converter to charge the second bus capacitor 222 coupled to the negative DC bus 107 (i.e., generate a negative DC voltage on the positive DC bus 107). More specifically, the controller 114 alternates switching of the first switch (Q1) 212, the second switch (Q2) 214, and the fourth switch (Q4) 218 to generate the desired negative voltage level on the negative DC bus 107. For example, when the first switch (Q1) 212 and the second switch (Q2) 214 are closed, the current path 402 passes from the neutral line 204 to the inductor 210, via the second switch (Q2) 214 and the first switch (Q1) 212, energy is stored in the inductor 210, and current through the inductor 210 increases (in a direction opposite to that during the first stage of the backup mode of operation).

When the first switch (Q1) 212 and the second switch 214 are subsequently opened, a resulting current path from the negative DC bus 107 to the inductor 210, via the body diode of the fourth switch (Q4) 218, is generated. The fourth switch (Q4) 218 can subsequently be operated to close by the controller 114. By operating the switches as described above, the desired negative DC voltage level can be generated on the negative DC bus 107.

As described above, in the backup mode of operation, the converter 104 generates a positive DC voltage on the positive DC bus 106 (during the first stage of the backup mode of operation) and a negative DC voltage no the negative DC bus 107 (during the second stage of the backup mode of operation). In at least one embodiment, the controller 114 synchronizes the operation of the converter 104 in the backup mode of operation with the operation of the inverter 108 coupled to the DC busses 106, 107. For example, the controller 114 can synchronize the first stage of the backup mode of operation (i.e., when the positive terminal 113 of the battery 112 is coupled to the inductor 210 and the converter operates to generate a positive DC voltage on the positive DC bus 106) with a positive half cycle of an output waveform provided by the inverter 108 to the output 110. The controller 114 can further synchronize the second stage of the backup mode of operation (i.e., when the negative terminal 113 of the battery 112 is coupled to the inductor 210 and the converter operates to generate a negative DC voltage on the negative DC bus 106) with a negative half cycle of the output waveform provided by the inverter 108 to the output 110.

As discussed above, the controller 114 is configured to monitor and control operation of the UPS 100. Using data stored in associated memory, the controller 114 is operable to execute one or more instructions that may result in the manipulation of one or more switches' conductive states. In some examples, the controller 114 can include one or more processors or other types of controllers. The controller 114 may perform a portion of the functions discussed herein on a processor, and perform another portion using an Application-Specific Integrated Circuit (ASIC) tailored to perform particular operations. Examples in accordance with the present invention may perform the operations described herein using many specific combinations of hardware and software and the invention is not limited to any particular combination of hardware and software components.

As described above, the PFC converter 104 is utilized in a single-phase UPS 100. However, in other embodiments, the PFC converter 104 can be utilized with any other type of single phase online UPS with positive and negative DC busses. For example, in one embodiment, the PFC converter 104 is utilized in a 120V (RMS value) UPS system with a 120V (nominal) battery. In such a system, the DC voltage level on the DC busses is regulated to be around 200V. In another embodiment, the PFC converter 104 is utilized in a 230V (RMS value) UPS system with a 192V (nominal) battery. In such a system, the DC voltage level on the DC busses is regulated to be around 400V.

In at least one embodiment, the converter can also be utilized in a higher power UPS with three phase inputs. For example, FIG. 5 is a schematic diagram of a converter 500 utilized in a three phase UPS.

Figure 5:
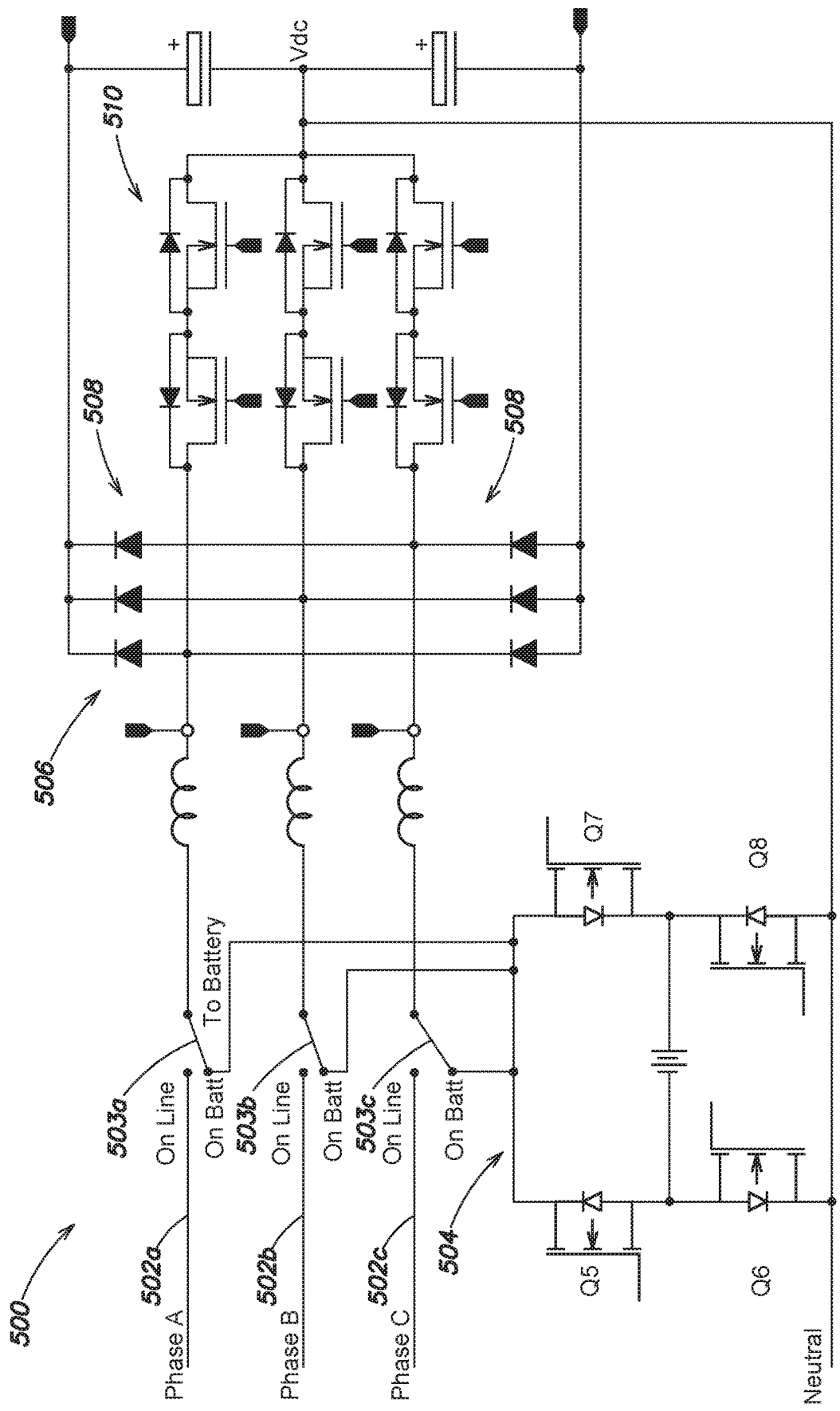
FIG. 5 is a schematic diagram of one embodiment of a three-phase converter according to aspects described herein.

As shown in FIG. 5, the converter 500 includes multiple inputs 502a-c (e.g., each configured to be coupled to one phase of a three-phase power source), a battery circuit 504 (e.g., such as the battery circuit 208 shown in FIG. 2), and a Vienna rectifier 506. An input switch 503a-c is configured to selectively couple the Vienna rectifier 506 to either a corresponding input 502a-c or the battery circuit 504. In at least one embodiment, the Vienna rectifier 506 includes Silicon Carbide (SiC) diodes 508 and MOSFETs 510; however, in other embodiments, the Vienna rectifier 506 is configured differently.

The converter 500 shown in FIG. 5 is operated in substantially the same way as the converter 103 described above with respect to FIGS. 2-4, except that it generates the regulated DC output from all three phase inputs, rather than one single phase input.

As described above, during the backup mode of operation (i.e., the on-battery mode of operation) the PFC converter can be reused in a UPS to convert DC power from the battery 112 to regulated DC power. The converter described above can be operated with relatively low losses/high efficiency.

According to at least one embodiment, since switches Q5-Q8 226-232 operate at line frequency and only switch the battery voltage, lower voltage switches (e.g., lower voltage MOSFETs) can be utilized as switches Q5-Q8 226-232. In one embodiment, the switches (Q1-Q8) 212-232 are GaN FETs and/or Metal-Oxide-Semiconductor Field-Effect Transistors; however, in other embodiments, different types of switches or transistors can be utilized.

In one embodiment, the third switch (Q3) 216 and the fourth switch (Q4) 218 are switches or transistors; however, in at least one embodiment, the third switch (Q3) 216 and the fourth switch (Q4) 218 can be replaced by diodes.

As described above, the battery circuit 208 is coupled to a dual DC bus PFC stage with AC switches (e.g., as shown in FIG. 2); however, in other embodiments, the battery circuit 208 can be coupled to a different type of PFC stage.

According to one embodiment, the battery circuit (e.g., shown in FIG. 2) includes a fuse in series with each switch Q5-Q8 226-232 in case of switch failure.

Having thus described several aspects of at least one embodiment of this invention, it is to be appreciated various alterations, modifications, and improvements will readily occur to those skilled in the art. Such alterations, modifications, and improvements are intended to be part of this disclosure and are intended to be within the spirit and scope of the invention. Accordingly, the foregoing description and drawings are by way of example only.

What is claimed is:
1. An Uninterruptible Power Supply (UPS) comprising:
an input configured to be coupled to an AC power source and to receive input AC power;
a battery circuit configured to be coupled to a DC source and to receive backup DC power;
a Power Factor Correction (PFC) stage including an interface;
an input switch configured to selectively couple the interface of the PFC stage to the input in an online mode of operation and to the battery circuit in a backup mode of operation;
a positive DC bus coupled to the PFC stage;
a negative DC bus coupled to the PFC stage; and
a controller coupled to the battery circuit and the PFC stage, the controller configured to operate:
in the online mode of operation the PFC stage to provide DC power, derived from the input AC power, to the positive DC bus and the negative DC bus,
in the backup mode of operation the PFC stage to provide DC power, derived from the backup DC power, to the positive DC bus and the negative DC bus,
in a first stage of the backup mode of operation the battery circuit to couple a positive terminal of the DC source to the interface of the PFC stage, wherein the first stage comprises current flowing from the positive terminal of the DC source to the interface, and
in a second stage of the backup mode of operation the battery circuit to couple a negative terminal of the DC source to the interface of the PFC stage, wherein the second stage comprises current flowing from the interface to the negative terminal of the DC source.
2. The UPS of claim 1, further comprising a neutral line, wherein the battery circuit comprises:
a first switch configured to be coupled between the input switch and the negative terminal of the DC source;
a second switch configured to be coupled between the negative terminal of the DC source and the neutral line;
a third switch configured to be coupled between the input switch and the positive terminal of the DC source; and
a fourth switch configured to be coupled between the positive terminal of the DC source and the neutral line.
3. The UPS of claim 2, wherein in operating the battery circuit to couple the positive terminal of the DC source to the interface of the PFC stage, the controller is further configured to operate the third switch to couple the positive terminal to the interface of the PFC stage via the input switch and to operate the second switch to couple the negative terminal to the neutral line.

4. The UPS of claim 2, wherein in operating the battery circuit to couple the negative terminal of the DC source to the interface of the PFC stage, the controller is further configured to operate the first switch to couple the negative terminal to the interface of the PFC stage via the input switch and to operate the fourth switch to couple the positive terminal to the neutral line.

5. The UPS of claim 1, wherein the PFC stage comprises:
an inductor coupled to the interface;
a plurality of switches coupled to the inductor;
a first bus capacitor coupled to the positive DC bus; and
a second bus capacitor coupled to the negative DC bus.

6. The UPS of claim 5, wherein in operating the PFC stage to provide DC power, derived from the backup DC power, to the positive DC bus and the negative DC bus, the controller is further configured to operate the plurality of switches, in the first stage of the backup mode of operation, to generate a positive DC voltage on the positive DC bus.

7. The UPS of claim 5, wherein in operating the PFC stage to provide DC power, derived from the backup DC power, to the positive DC bus and the negative DC bus, the controller is further configured to operate the plurality of switches, in the second stage of the backup mode of operation, to generate a negative DC voltage on the negative DC bus.

8. The UPS of claim 5, wherein the plurality of switches includes:
a fifth switch coupled to the inductor;
a sixth switch coupled between the fifth switch and the neutral line;
a seventh switch coupled between the inductor and the positive DC bus; and
an eighth switch coupled between the inductor and the negative DC bus.

9. The UPS of claim 8, wherein in operating the plurality of switches, in the first stage of the backup mode of operation, to generate the positive DC voltage on the positive DC bus, the controller is further configured to operate the fifth switch, the sixth switch, and the seventh switch as a boost converter to generate the positive DC voltage.

10. The UPS of claim 8, wherein in operating the plurality of switches, in the second stage of the backup mode of operation, to generate the negative DC voltage on the negative DC bus, the controller is further configured to operate the fifth switch, the sixth switch, and the eighth switch as a boost converter to generate the negative DC voltage.

11. The UPS of claim 7, further comprising an inverter coupled between the DC busses and the output and configured to provide an output AC voltage waveform derived from at least one of the input AC power and the backup DC power,
wherein the controller is further configured to synchronize generating the positive DC voltage on the positive DC bus with a positive half cycle of the output AC voltage waveform, and
wherein the controller is further configured to synchronize generating the negative DC voltage on the negative DC bus with a negative half cycle of the output AC voltage waveform.

12. The UPS of claim 1, wherein the PFC stage comprises a Vienna rectifier.

13. A method for operating a UPS comprising an input configured to be coupled to an AC power source, an output configured to provide output power to a load, a battery circuit, a PFC stage, a positive DC bus, and a negative DC bus, wherein the method comprises:
receiving input AC power at the input from the AC power source;
receiving backup DC power at the battery circuit from the DC power source;
operating the UPS in an online mode of operation in response to a determination that the
input AC power is greater than an input power threshold;
operating the UPS in a backup mode of operation in response to a determination that the input AC power is less than the input power threshold;
selectively coupling the input to an interface of the PFC stage in the online mode of operation;
selectively coupling the battery circuit to the interface of the PFC stage in the backup mode of operation;
converting, in the online mode of operation with the PFC stage, the input AC power into DC power provided to the positive and negative DC busses;
converting, in the backup mode of operation with the PFC stage, the backup DC power into the DC power provided to the positive and negative DC busses;
coupling, with the battery circuit in a first stage of the backup mode of operation, a positive terminal of the DC power source to the interface of the PFC stage, wherein the first stage comprises current flowing from the positive terminal of the DC source to the interface; and
coupling, with the battery circuit in a second stage of the backup mode of operation, a negative terminal of the DC power source to the interface of the PFC stage, wherein the second stage comprises current flowing from the interface to the negative terminal of the DC source.

14. The method of claim 13, wherein coupling the positive terminal of the DC power source to the interface of the PFC stage in the first stage includes:
operating a first switch to couple the positive terminal to the interface of the PFC stage; and
operating a second switch to couple the negative terminal to a neutral line.

15. The method of claim 13, wherein coupling the positive terminal of the DC power source to the interface of the PFC stage in the second stage includes:
operating a third switch to couple the negative terminal to the interface of the PFC stage; and
operating a fourth switch to couple the positive terminal to a neutral line.

16. The method of claim 13, wherein converting, in the backup mode of operation with the PFC stage, the backup DC power into the DC power provided to the positive and negative DC busses includes:
generating, during the first stage of the backup mode of operation, a positive DC voltage on the positive DC bus; and
generating, during the second stage of the backup mode of operation, a negative DC voltage on the negative DC bus.

17. The method of claim 16, wherein generating the positive DC voltage on the positive DC bus includes operating a plurality of switches in the PFC stage as a boost converter to generate the positive DC voltage.

18. The method of claim 16, wherein generating the negative DC voltage on the negative DC bus includes operating the plurality of switches in the PFC stage as a boost converter to generate the negative DC voltage.

19. The method of claim 16, wherein the UPS further comprises an inverter configured to provide an output AC voltage waveform derived from at least one of the input AC power and the backup DC power, and wherein the method further comprises:
    synchronizing generating the positive DC voltage on the positive DC bus with a positive half cycle of the output AC voltage waveform, and
    synchronizing generating the negative DC voltage on the negative DC bus with a negative half cycle of the output AC voltage waveform.

20. An Uninterruptible Power Supply (UPS) comprising:
    an input configured to be coupled to an AC power source and to receive input AC power;
    an output configured to provide output power to a load;
    a positive DC bus;
    a negative DC bus;
    a PFC stage coupled to the positive DC bus and the negative DC bus and configured to convert the input AC power into regulated DC power provided to the positive DC bus and the negative DC bus; and
    means for:
        selectively coupling the PFC stage to one of the input and a DC source, wherein a first stage of a backup mode of operation comprises current flowing from a positive terminal of the DC source to the means for selectively coupling the PFC stage to one of the input and the DC source, and wherein a second stage of the backup mode of operation comprises current flowing from the means for selectively coupling the PFC stage to one of the input and the DC source to a negative terminal of the DC source, and
        operating the PFC stage to convert backup DC power from the battery into the regulated DC power provided to the positive DC bus and the negative DC bus.

* * * * *